(12) United States Patent
Den Adel et al.

(10) Patent No.: US 8,865,245 B2
(45) Date of Patent: Oct. 21, 2014

(54) EDIBLE FAT POWDERS

(75) Inventors: Rudi Den Adel, Vlaardingen (NL);
Berend Jan Arends, Vlaardingen (NL);
Johannes Jozef M Janssen, Vlaardingen (NL); Teunis de Man, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 205 days.

(21) Appl. No.: 13/133,954

(22) PCT Filed: Dec. 1, 2009

(86) PCT No.: PCT/EP2009/066093
§ 371 (c)(1),
(2), (4) Date: Jun. 10, 2011

(87) PCT Pub. No.: WO2010/069746
PCT Pub. Date: Jun. 24, 2010

(65) Prior Publication Data
US 2011/0244111 A1 Oct. 6, 2011

(30) Foreign Application Priority Data
Dec. 19, 2008 (EP) .................................. 08172304

(51) Int. Cl.
| | | |
|---|---|---|
| A23D 9/00 | (2006.01) |
| A23D 9/05 | (2006.01) |
| A23D 7/02 | (2006.01) |
| A23D 7/005 | (2006.01) |
| A23D 7/00 | (2006.01) |

(52) U.S. Cl.
CPC .. *A23D 9/05* (2013.01); *A23D 7/02* (2013.01); *A23D 7/0056* (2013.01); *A23D 7/001* (2013.01)
USPC .......................................... 426/607; 426/601

(58) Field of Classification Search
USPC ................................................. 426/601, 607
See application file for complete search history.

(56) References Cited

U.S. PATENT DOCUMENTS

| | | | |
|---|---|---|---|
| 2,521,219 A | 9/1950 | Holman et al. |
| 2,615,160 A | 10/1952 | Baur |
| 2,815,286 A | 12/1957 | Andre |
| 3,120,438 A | 2/1964 | McIntire et al. |
| 3,170,799 A * | 2/1965 | Feuge et al. ................. 426/601 |
| 3,270,040 A | 8/1966 | Bradshaw et al. |
| 3,295,986 A | 1/1967 | Saslaw et al. |
| 3,338,720 A | 8/1967 | Pichel |
| 3,425,843 A | 2/1969 | Japikse |
| 3,528,823 A | 9/1970 | Rossen |
| 3,881,005 A | 4/1975 | Thakkar et al. |
| 3,892,880 A | 7/1975 | Grolitsch |
| 4,160,850 A | 7/1979 | Hallstrom et al. |
| 4,226,894 A | 10/1980 | Gawrilow |
| 4,232,052 A | 11/1980 | Nappen |
| 4,234,606 A | 11/1980 | Gawrilow |
| 4,308,288 A | 12/1981 | Hara et al. |
| 4,375,483 A | 3/1983 | Shuford et al. |
| 4,385,076 A | 5/1983 | Crosby |
| 4,391,838 A | 7/1983 | Pate |
| 4,578,274 A | 3/1986 | Sugisawa et al. |
| 4,591,507 A | 5/1986 | Bodor et al. |
| 4,826,699 A | 5/1989 | Soe |
| 4,855,157 A | 8/1989 | Tashiro et al. |
| 4,889,740 A | 12/1989 | Price |
| 4,917,915 A | 4/1990 | Cain et al. |
| 5,130,156 A | 7/1992 | Bergquist et al. |
| 5,186,866 A | 2/1993 | Ryuo et al. |
| 5,352,475 A | 10/1994 | Tholl |
| 5,391,382 A | 2/1995 | Chappel |
| 5,429,836 A | 7/1995 | Fuisz |
| 5,447,735 A | 9/1995 | Miller |
| 5,516,543 A | 5/1996 | Amankonah et al. |
| 5,620,734 A | 4/1997 | Wesdorp et al. |
| 5,707,670 A | 1/1998 | Mehansho et al. |
| 5,858,445 A * | 1/1999 | Huizinga et al. ............. 426/607 |
| 5,904,949 A | 5/1999 | Reddy et al. |
| 5,916,608 A | 6/1999 | Lanting et al. |
| 6,020,003 A | 2/2000 | Stroh et al. |
| 6,031,118 A | 2/2000 | Van Amerongen et al. |

(Continued)

FOREIGN PATENT DOCUMENTS

| | | |
|---|---|---|
| DE | 2253515 | 5/1974 |
| DE | 10253111 | 5/2004 |

(Continued)

OTHER PUBLICATIONS

Kochhar, Influence of Processing on Sterols of Edible Vegetable Oils, Prog. Lipid Res., 1983, vol. 22, pp. 161-188, Pergamon Press Ltd.
De Graaf, Consumption of tall oil-derived phytosterols in a chocolate matrix significantly decreases plasma total and low-density lipoprotein-cholesterol levels, British Journal of Nutrition, Jun. 18, 2002, 88, pp. 479-488.
Co-pending application Dobenesque et al., U.S. Appl. No. 13/133,956, filed Jul. 8, 2011.
Co-pending application Dobenesque et al., U.S. Appl. No. 13/139,584, filed Sep. 8, 2011.
Co-pending application Dobenesque et al., U.S. Appl. No. 13/133,955, filed Jul. 8, 2011.
Co-pending application Dobenesque et al., U.S. Appl. No. 13/133,952, filed Aug. 23, 2011.
Co-pending application Dobenesque et al., U.S. Appl. No. 13/139,580, filed Sep. 8, 2011.
Co-pending application Barendse et al., U.S. Appl. No. 11/884,282, filed Jul. 14, 2008.

(Continued)

*Primary Examiner* — Carolyn Paden
(74) *Attorney, Agent, or Firm* — Gerard J. McGowan, Jr.

(57) ABSTRACT

The invention relates to edible fat powders having a full width at half maximum of the first order long spacing X-ray diffraction peak of 0.17 to 0.80 degrees and a free flowing density of 10 to 350 g/l; with the proviso that when the free flowing density is equal to or greater than C, the full width at half maximum is equal to or greater than ((A*free flowing density)+B), wherein A is 0.0005625, B is 0.213 degrees and C is 90 g/l. The invention further relates to a method of preparing a fat continuous spread comprising the use of such edible fat powder.

20 Claims, 2 Drawing Sheets

(56) References Cited

U.S. PATENT DOCUMENTS

| | | | |
|---|---|---|---|
| 6,056,791 A | 5/2000 | Weidner et al. | |
| 6,106,886 A | 8/2000 | van Amerongen et al. | |
| 6,117,478 A | 9/2000 | Dubberke | |
| 6,129,944 A | 10/2000 | Tiainen et al. | |
| 6,156,370 A | 12/2000 | Huizinga et al. | |
| 6,190,680 B1 | 2/2001 | Sakurada et al. | |
| 6,217,920 B1 | 4/2001 | Van Endenburg et al. | |
| 6,248,389 B1 | 6/2001 | Biller et al. | |
| 6,284,302 B1 | 9/2001 | Berger et al. | |
| 6,312,752 B1 * | 11/2001 | Lansbergen et al. | 426/607 |
| 6,316,030 B1 | 11/2001 | Kropf et al. | |
| 6,322,842 B1 | 11/2001 | Reddy et al. | |
| 6,352,737 B1 | 3/2002 | Dolhaine et al. | |
| 6,395,324 B1 | 5/2002 | Effey et al. | |
| 6,423,326 B1 | 7/2002 | Shapiro | |
| 6,423,363 B1 | 7/2002 | Traska et al. | |
| 6,440,336 B1 | 8/2002 | Weinreich et al. | |
| 6,468,578 B1 | 10/2002 | Bodor et al. | |
| 6,533,252 B1 | 3/2003 | Bernard et al. | |
| 6,582,749 B2 | 6/2003 | Merrick et al. | |
| 6,616,849 B1 | 9/2003 | Osajima et al. | |
| 6,743,450 B2 | 6/2004 | Romanczyk, Jr. et al. | |
| 6,800,317 B2 | 10/2004 | Wester et al. | |
| 6,827,964 B2 | 12/2004 | Wester et al. | |
| 6,929,816 B2 | 8/2005 | Wester | |
| 6,986,846 B2 | 1/2006 | Shekunov et al. | |
| 7,601,184 B2 | 10/2009 | Tischendorf | |
| 7,862,751 B2 | 1/2011 | Foster et al. | |
| 8,025,913 B2 | 9/2011 | van den Berg et al. | |
| 8,124,152 B2 | 2/2012 | Janssen et al. | |
| 8,147,895 B2 | 4/2012 | Barendse et al. | |
| 8,211,470 B2 | 7/2012 | Kim | |
| 2002/0034577 A1 | 3/2002 | Vogensen | |
| 2002/0048606 A1 | 4/2002 | Zawistowski | |
| 2002/0076476 A1 | 6/2002 | Kuil et al. | |
| 2002/0132035 A1 | 9/2002 | Tamarkin et al. | |
| 2002/0168450 A1 | 11/2002 | Drudis et al. | |
| 2003/0068425 A1 | 4/2003 | Khare | |
| 2003/0124228 A1 | 7/2003 | Goto et al. | |
| 2003/0124288 A1 | 7/2003 | Merziger et al. | |
| 2003/0165572 A1 | 9/2003 | Auriou | |
| 2003/0203854 A1 | 10/2003 | Pischel et al. | |
| 2004/0076732 A1 | 4/2004 | Valix | |
| 2004/0101601 A1 | 5/2004 | Loh et al. | |
| 2004/0105931 A1 | 6/2004 | Basheer et al. | |
| 2004/0126475 A1 * | 7/2004 | Hashizume et al. | 426/601 |
| 2004/0166204 A1 | 8/2004 | Smith et al. | |
| 2004/0197446 A1 | 10/2004 | Haynes et al. | |
| 2005/0069625 A1 | 3/2005 | Chimel et al. | |
| 2005/0123667 A1 | 6/2005 | Sakuma et al. | |
| 2005/0170062 A1 | 8/2005 | Burling et al. | |
| 2005/0196512 A1 | 9/2005 | Nakhasi et al. | |
| 2006/0019021 A1 | 1/2006 | Plank et al. | |
| 2006/0051479 A1 | 3/2006 | Chiavazza et al. | |
| 2006/0115553 A1 | 6/2006 | Gautam et al. | |
| 2006/0280855 A1 | 12/2006 | Van den Berg et al. | |
| 2007/0054028 A1 | 3/2007 | Perlman et al. | |
| 2008/0089978 A1 | 4/2008 | Grigg et al. | |
| 2008/0187645 A1 | 8/2008 | Ekblom et al. | |
| 2008/0193628 A1 | 8/2008 | Garbolino et al. | |
| 2008/0226786 A1 | 9/2008 | Ward et al. | |
| 2012/0018535 A1 | 1/2012 | Wubbolts et al. | |
| 2013/0004522 A1 | 1/2013 | Dvir et al. | |

FOREIGN PATENT DOCUMENTS

| | | |
|---|---|---|
| EP | 21483 A1 | 1/1981 |
| EP | 0089082 A1 | 9/1983 |
| EP | 0237120 A1 | 9/1987 |
| EP | 0294692 A | 12/1988 |
| EP | 393963 A2 | 4/1990 |
| EP | 572051 A1 | 3/1993 |
| EP | 0744992 | 2/1995 |
| EP | 0744992 B1 | 2/1995 |
| EP | WO9521688 | 8/1995 |
| EP | 775444 A1 | 5/1997 |
| EP | 0780058 A1 | 6/1997 |
| EP | 0796567 A | 9/1997 |
| EP | 897671 B1 | 2/1999 |
| EP | 0898896 A1 | 3/1999 |
| EP | 0962150 A2 | 12/1999 |
| EP | 1114674 A2 | 7/2001 |
| EP | 1180545 A1 | 2/2002 |
| EP | 1197153 A1 | 4/2002 |
| EP | 1238589 | 8/2002 |
| EP | 1285584 A2 | 2/2003 |
| EP | 1419698 A1 | 5/2004 |
| EP | 1557090 A1 | 7/2005 |
| EP | 1795257 A1 | 6/2007 |
| EP | 1815752 A1 | 8/2007 |
| EP | 2016834 A1 | 1/2009 |
| EP | 2123164 A1 | 11/2009 |
| EP | 2181604 A1 | 5/2010 |
| FR | 2776167 A | 9/1999 |
| GB | 2095968 A | 10/1982 |
| GB | 2208296 A | 3/1989 |
| JP | 62239949 | 10/1987 |
| JP | 02299544 | 12/1990 |
| JP | 2003210107 | 7/2003 |
| WO | WO9308699 | 5/1993 |
| WO | WO9614755 A1 | 5/1996 |
| WO | WO9619115 A1 | 6/1996 |
| WO | WO9638047 | 12/1996 |
| WO | WO9742830 | 11/1997 |
| WO | W09847386 | 10/1998 |
| WO | WO9956558 | 11/1999 |
| WO | WO0041491 | 7/2000 |
| WO | WO0100046 A1 | 1/2001 |
| WO | WO0132035 A1 | 5/2001 |
| WO | WO0143559 A2 | 6/2001 |
| WO | WO0166560 A2 | 9/2001 |
| WO | WO0178529 A2 | 10/2001 |
| WO | WO0191569 A1 | 12/2001 |
| WO | WO02100183 A2 | 12/2002 |
| WO | WO03043430 A1 | 5/2003 |
| WO | WO03084337 | 10/2003 |
| WO | WO03966817 A1 | 11/2003 |
| WO | WO03103633 A1 | 12/2003 |
| WO | WO2004093571 A1 | 11/2004 |
| WO | WO2005014158 | 2/2005 |
| WO | WO2005014158 A1 | 2/2005 |
| WO | WO2005071053 A1 | 8/2005 |
| WO | WO2005074717 A1 | 8/2005 |
| WO | WO2005074726 A1 | 8/2005 |
| WO | WO2006005141 A2 | 1/2006 |
| WO | WO2006066979 A1 | 6/2006 |
| WO | W02006087092 | 8/2006 |
| WO | W02006087093 A1 | 8/2006 |
| WO | WO2006079445 A1 | 8/2006 |
| WO | WO2006087090 A1 | 8/2006 |
| WO | WO2007022897 A1 | 3/2007 |
| WO | WO2007024770 A2 | 3/2007 |
| WO | WO2007039020 A1 | 4/2007 |
| WO | WO2007039040 A1 | 4/2007 |
| WO | WO2007096211 A1 | 8/2007 |
| WO | WO2007096243 A1 | 8/2007 |
| WO | WO2008125380 A1 | 10/2008 |
| WO | WO2009068651 A1 | 6/2009 |
| WO | WO2010053360 A1 | 5/2010 |
| WO | WO2010060713 A1 | 6/2010 |
| WO | WO2010069746 A1 | 6/2010 |
| WO | WO2010069747 A1 | 6/2010 |
| WO | WO2010069750 A1 | 6/2010 |
| WO | WO2010069751 A1 | 6/2010 |
| WO | WO2010069752 A1 | 6/2010 |
| WO | WO2010069753 A1 | 6/2010 |
| WO | WO2011160921 A1 | 12/2011 |

OTHER PUBLICATIONS

Co-pending application Janssen et al., U.S. Appl. No. 11/884,292, filed Apr. 23, 2008.

Co-pending application Garbolino et al., U.S. Appl. No. 11/884,293, filed Aug. 14, 2007.

(56) References Cited

OTHER PUBLICATIONS

Co-pending application Garbolino et al., U.S. Appl. No. 11/884,289, filed May 2, 2008.
Co-pending application van den Berg et al., U.S. Appl. No. 13/224,550, filed Sep. 2, 2011.
Munuklu et al., Supercritical Melt Micronization Using the Particles from Gas Saturated Solution Process, American Chemical Society Symposium, 2003, 860, Chapter 23, pp. 353-369.
Hydrogenation, Wikipedia Hydrogenation, -1-10.
Interesterified fat, Wikipedia Article Sources and Contributors, 1-4.
Norizzah Effects of Chemical Interesterification on Physicochemical Properties of Palm Stearin and Palm Kernel Olein Blends, Food Chemistry 86 229, 2004, pp. 229-235, 86, Elsevier.
Charteris, Edible table (bio) spread containing potentially probiotic Lactobacillus and Bifidobacterium species, International Journal of Dairy Technology, Feb. 2002, 44-56, 55 1.
Gunstone et al, Food uses of oils and fats, The Lipid Handbook, 2007, 336-341, Third Edition.
Gunstone et al Occurrence and Characterisation of Oils and Fats, The Lipid Handbook, 2007, pp. 51, 55, 63, 66 and 67, 3rd edition.
Johansson et al., Water-in-Triglyceride Oil Emulsions, Effect of Fat Crystals on Stability, JAOCS, 1995, 939-950, 72(8), AOCS Press.
Lipson, et al, Interpretation of X-ray Powder diffraction Patterns, H Lipson and H Steeple 1970, 244-263. Chapter 9.
Micallef et al., Beyond blood lipids: phytosterols, statins and omega-3 polyunsaturated fatty acid therapy for hyperlipidermia, Journal of Nutritional Biochemistry, Jun. 19, 2009, 927-939, 20, Elsevier.
De Cock, Structure development in confectionery products: importance of triacylglycerol composition, Universiteit Gent Faculteit Bio-ingenieurswetenschappen, 2011 1-73.
Shahid et al, Margarine processing plants and equipment, Bailey's Industrial Oil and Fat Products, 2005, 502 and 518, 5.
Strawberry Powder Flavor GA1403, Strawberryflavor,com 2005 p. 1.
Anonymous, Particle Sizes of Milk Powders, Dairy Ingredients, 2000, pp. 1-2, 2-4, Dairy Products Technology Center, US.
Belitz et al., Milk and Dairy Products, Food Chemistry, 1999, 470-474, 497-49 XP-002264854 Table 10.4, Springer Verlag, Berlin, DE.
Davidson, Powdered fats for soups and sauces—and a range of other food products, Food Ingredients and Analysis International, 2001, 29-30, 23 (4).
Elvers et al, Margarines and shortenings, Ullmanns Encyclopedia of Industrial Chemistry, 1990, 156-158, 5th Edition. vol. A16.
Garti et al., Stabilization of Water-in-Oil Emulsions by Submicrocrystalline a-Form Fat Particles, Journal of the American Oil Chemists' Society, 1998, 1825-1831, 75, 12.
Gerber et al., Effect of Process-Parameters on Particles Obtained by the Rapid Expansion of Supercritical Solutions, World Congress on Particle Technology 3, 1998, 1-11.
Gunstone et al., Polymorphism and nomenclature of lipid crystal forms, The Lipid Handbook 1995 8.1.3 p. 405, Jan. 1, 1995, p. 405, 8.1.3, Chapman & Hall.
Gunstone, The Lipid Handbook, The Lipid Handbook 2nd ED, 1994, 321,2nd ED, Chapman & Hall.
Lopez et al, Milk fat and primery fractions obtained by dry fractionation 1. Chemical composition and crystallisation properties, Chemistry and Physics of Lipids, 2006, 17-33, 144, Elsevier.
Munuklu, Experimental and Analytical Facilities, Delft University of Technology 2035 4 p. 41-51.
P. Munuklu et al, Particle formation of edible fats using the supercritical melt micronization process (ScMM), Journal of Supercritical Fluids, 2007, 181-190, 43.
Pernetti et al, Structuring of edible oils by alternatives to crystalline fat, Colloid & Interface Science, Jul. 18, 2007, 221-231, vol. 12.
Turk et al., Micronization of pharmaceutical substances by the rapid expansion of supercritical solutions (RESS): a promising method to improve bioavailability of poorly soluble pharmaceutical agents, Journal of Supercritical Fluids, 2002, 75-84, 22, Elsevier.
Van Den Enden et al., Rapid Determination of Water Droplet Size Distributions by PFG-NMR, Journal of Colloid and Interface Science, 1990, 105-113, vol. 140 No. 1.
Van Den Enden, A method for the determination of the solid phase content of fats using pulse nuclear magnetic resonance, Fette Seifen Anstrichmittel, Sep. 23, 1977, 180-186, 80.
International Search Report and Written Opinion Appln. No. PCT/EP2009/066093 mailed Mar. 17, 2010.
European Search Report Application No. EPO08172304 completed May 28, 2009.

* cited by examiner

EDIBLE FAT POWDERS

FIELD OF THE INVENTION

The present invention relates to edible fat powders and use of such edible fat powders to prepare fat continuous spreads.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising from 10 to 40 wt % fat on total composition, are for example hardness, spreadability and ability to withstand temperature cycling. Temperature cycling means that the product is subjected to low and high temperatures (e.g. when the consumer takes the product out of the refrigerator and leaves it for some time at the table to use it). This may have a negative influence on the structure of the spread (like for example destabilization of the emulsion or oil-exudation).

Generally edible fat continuous food products like for example margarines and similar edible fat continuous spreads are prepared according to known processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids (SAFA) in the structuring agent is usually relatively high. Also trans fatty acid may be present. Some experts have called for reductions in these fatty acids to improve cardiovascular health.

Some consumers prefer spreads that have a low energy density (for example products that are low in total fat) and/or are low in SAFA but still have a good nutritional profile (by providing for example essential fatty acids like omega-3 and omega-6).

A further disadvantage of the known processes is that the product may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1285584 A2 discloses a method to prepare a margarine encompassing taking the solid fat component, together with a minimal amount of the oil phase, cryogenically re-crystallizing it and then combining it with an emulsion of the aqueous phase dispersed in the remainder of the oil phase or by adding the oil and aqueous phases sequentially. The disclosed shortenings and spreads contain relatively high levels of structuring fat (e.g. 25 wt % or more). Furthermore, the structuring fats are partly or fully hydrogenated.

Food Ingredients and Analysis International Vol. 23 No. 4 pages 29-30 (2001) describes powdered fats based on cryogenic technology that can be used for example in pourable margarines and different types of soft fat spreads. It is however mentioned that powdered fats may be used in combination with liquid oil, but for optimal performance these products need a specially designed fat composition which is crystallized from the melt. This will give the best structure of the crystal fraction, and allows a stabilizing network of crystals to be formed during cooling.

EP 1651338 A1 discloses a process for the preparation of an edible dispersion like for example margarine, wherein the dispersion is formed by mixing oil, solid structuring agent particles and an aqueous phase and/or solid phase. The solid structuring agent particles have a microporous structure of submicron size particles. The solid structuring agent particles can be prepared using a micronisation process.

We have found that using fat powder to make a fat continuous spread like for example a low fat spread may not always result in a spread of predictable and/or acceptable quality for the consumer on aspects like for example stability, structure or nutrition, and depends at least in part on the quality of the fat powder itself.

It is an object of the present invention to provide edible fat powders that can be used to make a fat continuous food product of predictable quality, more specifically to make a fat continuous spread, like for example a margarine or low fat spread, of predictable quality.

Another object of the invention is to provide edible fat powders that can be used to make a fat continuous food product with improved properties like spreadability and/or heat stability and/or hardness, more specifically to make a fat continuous spread, like for example a margarine or low fat spread, with improved properties like spreadability and/or heat stability and/or hardness.

SUMMARY OF THE INVENTION

It was found that one or more of the above objects is attained by edible fat powders having a certain full width at half maximum and free flowing density.

Accordingly in a first aspect the invention relates to an edible fat powder having a specific full width at half maximum of the first order long spacing X-ray diffraction peak and free flowing density.

The invention also relates to a method of preparing a fat continuous spread comprising the use of such edible fat powder.

Spreads, for example low fat spreads, made with edible fat powders according to the invention have a better structure and/or are more stable, especially when the spread has been subjected to a heat stability test.

DETAILED DESCRIPTION OF THE INVENTION

Weight percentage (wt %) is based on the total weight of the composition unless otherwise stated.

The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' refers to a fat that is solid at ambient temperature.

Ambient temperature is a temperature of about 20 degrees Celsius.

Edible fat powders according to the invention have a full width at half maximum of the first order long spacing X-ray diffraction peak of 0.17 to 0.80 degrees and a free flowing density of 10 to 350 g/l; with the proviso that when the free flowing density is equal to or greater than C, the full width at half maximum is equal to or greater than ((A*free flowing density)+B), wherein A is 0.0005625, B is 0.213 degrees and C is 90 g/l.

Full Width at Half Maximum (FWHM)

The Full Width at Half Maximum (FWHM) of the first order long spacing X-ray diffraction peak of the edible fat powder according to the invention is derived from the Small Angle X-ray Scattering measurement (SAXS) of the fat powder. The FWHM used, is the FWHM that has been corrected for instrumental line broadening. By correcting for the equipment dependent instrumental line broadening the FWHM is made equipment independent. Thus, the FWHM as recited in the claims is the equipment independent FWHM value.

Instrumental line broadening is accounted for by correcting the measured FWHM of the fat powder with the FWHM of a reference material. For the correction, the FWHM values as measured for the fat powders are corrected by subtracting the FWHM value of the reference material. For the purpose of the present invention the instrumental line broadening is determined by measuring the 1 1 1 Si reflection of NIST Standard Reference Material 640.

Small Angle X-Ray Scattering (SAXS)

The FWHM is measured on a Bruker D8 Discover X-ray diffractometer with GADDS (General Area Detector Diffraction System) in a theta/theta configuration as described in full in the experimental section.

It may be that the SAXS measurement results in more than one diffraction peak. If this is the case and the diffraction peaks are present as single peaks then the FWHM of each of these peaks is determined. If at least one FWHM complies with the FWHM as claimed the edible fat powder is a fat powder according to the present invention, subject to the required other features.

If more than one diffraction peak is present and one peak (partly) overlaps with another peak the SAXS measurement should be repeated on an X-ray system providing more resolution to separate the peaks. For example an X-ray system with a longer sample-detector distance and/or a higher detector resolution and/or a higher brilliance. For example using a synchrotron facility. The measuring conditions should be similar to those as described in the experimental section. That is, the measurement must be done in transmission mode at 5 degrees Celsius with a wavelength of 0.15418 nm. The X-ray system dependent conditions, such as the required measuring time, are easily determined by the person skilled in the art.

Edible Fat Powder

Edible fat powders according to the invention are powders at a temperature of about 5 degrees Celsius. The term 'powder' is defined as generally understood by the skilled person.

Edible fat powders according to the invention are fat powders suitable for structuring a fat continuous spread. When used for making a spread, the edible fat powder serves to structure the spread by providing at least part of the structuring fat for the spread. The fat powder thus comprises structuring fat. Structuring fat as commercially available may comprise minor amounts of other components like for example monoglycerides that are naturally present and may likewise be present in the fat powder.

In addition to these naturally present components the edible fat powder may comprise additional components like for example emulsifier or liquid oil. It will be appreciated that care must be taken to prevent the properties of the fat powder to be detrimentally affected. For example, the presence of liquid oil may affect the ability to form a powder (e.g. may result in a sticky powder or no recognizable powder), depending on the structuring fat and the liquid oil as well as the amounts thereof. It is within the reach of the skilled person to determine without undue burden how much of the additional components may be present using common general knowledge.

As the purpose of the fat powder is to provide structure to the spread it may be preferred not to include too many and/or too much of additional components that do not primarily add to the structuring ability of the fat powder, like for example protein and carbohydrates. Preferably the fat powder comprises not more than 20 wt % of protein and/or carbohydrates, more preferably not more than 15, even more preferably not more than 10, and still more preferably not more than 5. Most preferably no protein and carbohydrates are present.

The fat powder comprises structuring fat and preferably comprises at least 80 wt % of structuring fat, more preferably at least 85 wt %, even more preferably at least 90 wt %, still more preferably at least 95 wt % and most preferably at least 98 wt %. Most preferably the edible fat powder essentially consists of structuring fat.

The structuring fat may be a single fat or a mixture of different fats. The structuring fat may be of vegetable, animal or marine origin. Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of structuring fat of vegetable origin.

The amount of fat powder used is suitably chosen such that the required structuring (i.e. stable emulsion) is obtained. It will be appreciated that the amount of fat powder depends on the amount of structuring fat in the fat powder and the desired amount of structuring fat on total product. Preferably the amount of structuring fat on total amount of product is 1 to 20 wt %, more preferably 2 to 15 wt % and even more preferably 4 to 12 wt %.

To optimize the structuring capacity and/or impression of the spread in the mouth structuring fats having a certain solid fat content are preferred. Therefore, the structuring fat as present in the edible fat powder preferably has a solid fat content N10 from 50 to 100, N20 from 26 to 95 and N35 from 5 to 60.

Fat powders according to the invention have a full width at half maximum of the first order long spacing X-ray diffraction peak of 0.17 to 0.80 degrees and a free flowing density of 10 to 350 g/l; with the proviso that when the free flowing density is equal to or greater than C, the full width at half maximum is equal to or greater than ((A*free flowing density)+B), wherein A is 0.0005625, B is 0.213 degrees and C is 90 g/l.

The following examples are given to illustrate how this should be interpreted. A fat powder with a FWHM of 0.275 and a free flowing density of 64 is a fat powder according the invention. A fat powder with a FWHM of 0.295 and a free flowing density of 157 is not a fat powder according to the invention as the FWHM of 0.295 is smaller than ((0.0005625*157)+0.213)=0.3013).

Preferably the FWHM is from 0.17 to 0.70 degrees, more preferably 0.19 to 0.65, even more preferably 0.21 to 0.60, still more preferably 0.23 to 0.55 and most preferably 0.25 to 0.55, like for example 0.30 to 0.50 or 0.35 to 0.45.

Preferably the free flowing density is from 20 to 300 g/l, more preferably 25 to 250, even more preferably 30 to 200, still preferably 35 to 180 and most preferably 40 to 150 like for example 45 to 140.

Preferably A is 0.0005800, more preferably 0.0006000, even more preferably 0.0006500 and still more preferably 0.0007000.

Preferably B is 0.220 degrees, more preferably 0.225, even more preferably 0.230, still more preferably 0.240 and most preferably 0.250.

Preferably C is 80 g/l, more preferably 70, even more preferably 60 and still more preferably 50. Most preferably C is 40 g/l or even more most preferably 20 and still more most preferably 0.

It is noted that for edible fat powders comprising more than 5 wt % emulsifier C is 50 g/l, preferably 40, more preferably 30, even more preferably 20 and most preferably 0.

Making of Edible Fat Powders According to the Invention

Fat powders according to the invention may be suitably made using Super Critical Melt Micronisation (ScMM), also known as particles from gas saturated solutions (PGSS). This is a commonly known method and is for example described in J. of Supercritical Fluids 43 (2007) 181-190 and EP1651338.

Suitable fat powders may be prepared using ScMM taking care that the amount of dissolved CO2 is relatively high like for example 20, 25, 30 or 35 wt %. This is a function of the pressure and temperature of the CO2-melt mixture. It is also important to keep the difference between the temperature of the nozzle and the crystallization temperature of the structuring fat close to each other.

Furthermore, it is important that enough external cooling gas is used. Keeping this in mind it is within the reach of the skilled person to prepare edible fat powders according to the invention. Further details are given in the experimental section.

Spreads Using Fat Powders

Spreads made with fat powders according to the invention show improved properties like hardness, spreadibility, absence of free water after spreadibility and water droplet size (D3,3).

Smaller water droplet sizes are preferred as this leads to increased microbiological stability. Important moments to measure the water droplet size of the spread are after storage and after subjecting the spread to elevated temperatures (i.e. heat stability test). The latter simulates the consumer behavior of taking the spread out of the refrigerator for use and after some time putting it back in the refrigerator. It will be appreciated that in both cases a small droplet size and/or a minimum increase in droplet size is preferred.

The water droplet size of a spread before the heat stability test is preferably below 30 micrometer. The water droplet size after the heat stability test should preferably stay below 60 micrometer.

In a further aspect the invention relates to a method of preparing a fat continuous spread comprising the use of the edible fat powder according to the invention.

The process for the preparation of an edible fat continuous spread comprising an aqueous phase, comprises the steps of:
a. mixing fat powder and oil wherein the fat powder comprises structuring fat to provide a slurry;
b. providing an aqueous phase;
c. mixing the slurry and aqueous phase to form an oil continuous emulsion;
wherein the fat powder is edible fat powder according to the invention.

Preferably the slurry is kept at a temperature equal to or below 25 degrees Celsius, and the aqueous phase is cooled prior to mixing to such an extent that the temperature of the mixture of slurry and aqueous phase is kept equal to or below 25 degrees Celsius.

Preferably the spread comprises from 5 to 40 wt % fat, more preferably 10 to 35 and most preferably 15 to 30.

The oil in the slurry is liquid oil and may be single oil or a mixture of different oils, and may comprise other components. Preferably at least 50 wt % of the oil (based on total amount of oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

EXAMPLES

The fat powder must be analyzed within 4 weeks after production and must have been stored, if applicable, at a temperature of 5 degrees Celsius or lower. The fat powder may not be subjected to temperatures above 5 degrees Celsius to prevent modification of the fat powder. The fat powder may not be subjected to extensive vibrations or the like to prevent the free flowing density of the powder to be affected as suitably known to the skilled person.

Free Flowing Density

The free flowing density of the fat powder is measured according to the following protocol.

A 1000 ml plastic measuring cylinder (width 64 mm, height of the one litre mark is 330 mm), a wide mouth plastic funnel (conical 15 cm, cylindrical 2.5 cm) and a metal scoop are cooled for at least 1 hour at 5 degrees Celsius.

The cylinder is placed on a balance and the balance is reset to zero.

The funnel is placed on the cylinder and the fat powder is added till the cylinder is full (i.e. 1000 ml) in about 3 to 4 scoops.

The funnel is carefully removed as to minimize any vibrations.

The cylinder with the fat powder is weighed. This weight is the free flowing density of the fat powder (i.e. the weight of the cylinder with fat powder minus the weight of the empty cylinder).

Full Width at Half Maximum (FWHM)

The Full Width at Half Maximum (FWHM) of the first order long spacing X-ray diffraction peak of the edible fat powder according to the invention is derived from the Small Angle X-ray Scattering measurement (SAXS) of the fat powder according to the following protocol.

The FWHM of the fat powder was measured on a Bruker D8 Discover X-ray diffractometer with GADDS (General Area Detector Diffraction System) (ex Bruker AXS, Delft, NL) (Part No: 882-014900 Serial No: 02-826) in a theta/theta configuration. A copper anode was used, and the K-alpha radiation with wavelength 0.15418 nm was selected.

The X-ray source and the GADDS-detector were positioned at 0 degrees 2 Theta, to realize transmission measurements. To prevent the detector from being hit by the primary beam a lead beam stopper was precisely positioned in the middle and just in front of the detector.

The fat powder was measured at 5 degrees Celsius using a Linkam temperature stage (model THMS 600, from Linkam Scientific Instruments Ltd, UK). The fat powder sample was enclosed by X-ray Mylar film (Chemplex Cat. NO: 100 (2.5 μm), from Chemplex Industries Inc) in the sample holder of the Linkam stage by using a spacer having a thickness of 2.5 mm and a diameter of 8.5 mm. The Linkam stage was modified such that the hole is sufficiently big to allow the diffraction beam to reach the detector. The removable tray of the Linkam stage and the spacer were cooled in a refrigerator to 5 degrees Celsius prior to the measurement. The spacer was filled at 5 degrees Celsius with fat powder with a metal spatula that was cooled to 5 degrees Celsius prior to use. The Linkam stage was positioned on the x,y,z table of the D8 Discover and the liquid nitrogen pump and heating module were placed in the cabinet during measurements.

The instrumental parameters as used are shown in the table below.

TABLE 1

| D8 Discover instrumental parameters for fat powder measurements | |
| --- | --- |
| Theta 1 (degrees) | 0.000 |
| Theta 2 (degrees) | 0.000 |
| Detector Bias (kV) | 40 |
| Detector Bias (mA) | 40 |
| Measuring time (seconds) | 150 |
| Collimator (mm) | 0.3 |
| Detector distance (cm) | 25 |
| Tube Anode | Cu |

In a 2-Theta range from 1 degree to 10 degrees the diffraction signal was measured.

One dimensional X-ray diffraction patterns were determined from the 2D images using the GADDS software (version 4.1.28). The obtained X-ray diffraction patterns were imported in the Bruker EVA software (version 12.0) and the FWHM was determined.

The FWHM of the fat powder samples as measured with the Bruker D8 was corrected for instrumental line broadening. The correction factor is determined using the FWHM of the 1 1 1 Si reflection of NIST Standard Reference Material 640.

The correction factor for the Bruker D8 Discover X-ray diffractometer with GADDS as used was determined to be 0.180 degrees.

Stevens Value

Stevens values give an indication about the hardness (also called firmness) of a product. The Stevens value is determined according to the following protocol.

Freshly prepared products are stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Spreadibility

Spreadibility is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Free Water

After spreading a sample of a fat spread, the stability of the emulsion after spreading is determined by using indicator paper (Wator, ref 906 10, ex Machery-Nagel, DE) which develops dark spots where free water is adsorbed.

A stable product does not release any water and the paper does not change. Very unstable products release free water easily and this is indicated by dark spots on the paper.

A six point scale is used to quantify the quality of fat spread (DIN 10 311):

0 (zero) is a very stable and good product;

1 (one) is showing some loose moisture (one or two spots, or the paper changes a little in color as a total);

2 (two) as one but more pronounced;

3 (three) as one but to an almost unacceptable level;

4 (four) indicator paper is almost fully changing into a darker color;

5 (five) the paper changes completely and very fast into the maximum level of color intensity.

Spreads with a score of 4 or 5 are rejected for their stability. Spreads with a score of 0 or 1 show an acceptable quality with respect to free water.

Water Droplet Size Distribution of Spreads (D3,3 Measurement)

The normal terminology for Nuclear Magnetic Resonance (NMR) is used throughout this method. On the basis of this method the parameters D3,3 and exp(σ) of a lognormal water droplet size distribution can be determined. The D3,3 is the volume weighted mean droplet diameter and a is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

The tube containing the small amount of product, 0.66 gram, is then stored for about 20 hours at 30 degrees Celsius, followed by stabilizing at 5 degrees Celsius for at least one hour. The droplet size is then measured to give the D3,3 after heat stability test at 30 degrees Celsius and re-stabilization at 5 degrees Celsius.

Solid Fat Content (SFC) Measurements

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Moisture Content in Fat Spreads

The moisture content is measured by evaporation of the water at elevated temperature. A Moisture Analyzer type HB43-S (ex Mettler-Toledo GmbH, Laboratory & Weighing Technologies, CH) is used.

The moisture content is determined from the weight loss of a sample dried by heating with a halogen heating module. The sample is about 1-2 gram of product in an aluminum pan with a bed of silver sand of about 3-4 gram and is covered with filter paper.

The value is expressed as wt % of moisture in the fat spread.

Preparation of Edible Fat Powders

Set Up for Continuous Production of Fat Powder (Set-Up A)

Figure 1:
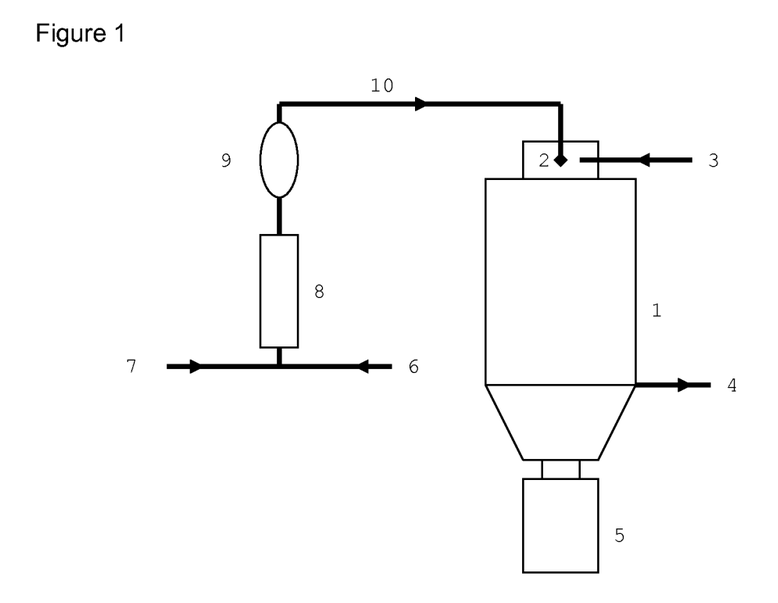
FIG. 1 is a schematic representation of the set up for the continuous production of edible fat powder as used for the preparation of examples 1 to 4 and 13 and comparative examples C-1 to C-4 and C-13.

FIG. 1 is a schematic representation of the set up for the continuous production of edible fat powder as used for the preparation of examples 1 to 4 and 13 and comparative examples 0-1 to 0-4 and 0-13.

Set-up A consists of an inlet for molten fat (7) and an inlet for supercritical CO2 (6) leading into a static mixer (8) (Sulzer SMX DN10 with 11 elements) to provide a CO2-melt mixture that is subsequently cooled in a heat exchanger (9) to the desired temperature-pressure conditions at pressure swirl nozzle (2) (SK series "SprayDry®" nozzle, for orifice and core see Table 2B, ex Spray Systems).

The fat is drawn from a thermo-stated storage tank with a Lewa membrane pump equipped with food-grade oil. A similar pump is used to draw liquid CO2 from a storage tank at low temperature. The temperature at which the liquid CO2 is pumped should be low enough to avoid cavitation in the pump. In between the pump and the mixing point with the fat the CO2 is heated to the same temperature as the fat in a tubular heat exchanger.

The CO2-melt mixture is sprayed into expansion vessel (1) via nozzle (2). The expansion vessel is thermally insulated and is essentially at atmospheric pressure. The top section has a diameter of 35 cm and a height of 18 cm. The cylindrical middle section has a diameter of 55 cm and a height of 81 cm. The conical bottom section has a height of 36 cm and is converging to an opening of diameter 15 cm, which can be closed with a simple valve when a full powder collection drum (5) has to be replaced with an empty one without interrupting the process. An additional stream of CO2 cooling gas (3) is fed into the expansion vessel from behind the nozzle. Its flow rate has to be chosen such that the desired final temperature of the powder is reached. The gas leaves the expansion vessel via a fine grid (4) of height 23 cm along the circumference of the vessel just above the conical part. The grid is covered with a filter cloth that retains the powder without clogging too fast. The tubing (10) connecting the parts up to the nozzle has an internal diameter of 9.5 mm. The length between the static mixer and the nozzle is about 4 meter.

Preparation of Fat Powders Using Set-Up A

A stream of molten fat (7) was combined with a stream of supercritical CO2 (6) at a pressure and temperature at which a substantial amount of CO2 dissolved into the molten fat, resulting in a melt of molten fat and dissolved CO2. After passing the static mixer (8) for rapid dissolution of the CO2, the CO2-melt mixture was cooled to the chosen nozzle temperature in the heat exchanger (9). The CO2-melt mixture was expanded (i.e. sprayed) over the nozzle (2) to atmospheric pressure in expansion vessel (1) and external CO2 gas (3) at the top of the expansion vessel was used for additional cooling. Upon expansion of the CO2-melt mixture into the expansion vessel the evaporation of dissolved CO2 and the entrainment of CO2 gas into the spray caused crash-cooling conditions, which lead to very rapid solidification. The resulting powder was collected in drum (5) below the expansion vessel and stored at a temperature of minus 5 degrees Celsius. The gas left the expansion vessel via the fine grid (4).

The exact process conditions are given in Table 2A and 2B below.

The FWHM and free flowing density were determined according to the methods as described above. The results are given in Table 3 below.

The fat mix used in examples 1 to 4 and comparative examples C-1 to C-4 is a mix of 85.7 wt % of inES48 and 14.3 wt % of Dimodan HP. inES48 is an interesterified mixture of 65% dry fractionated palm oil stearin with an Iodine Value of 14 and 35% palm kernel oil. Dimodan HP is a molecularly distilled mono/diacylglyceride mixture derived from fully hardened palm oil (90% monoglyceride) ex Danisco. This fat mix makes up the molten fat as used above.

The fat used in example 13 and comparative example C-13 is inES48.

TABLE 2A

| Fat powders prepared using set-up A | | | | | | | |
|---|---|---|---|---|---|---|---|
| Example | A | B | C | D | E | F | G |
| 1 | 12 | 5 | 242 | 60.8 | 16 | −13 | −5 |
| 2 | 31 | 12 | 208 | 61.5 | 24 | 20 | 1 |
| 3 | 10 | 4 | 137 | 60.7 | 19 | −16 | −10 |
| 4 | 29 | 23 | 305 | 63.1 | 33 | 0 | 0 |
| 13 | 18.8 | 7.3 | 270 | 63.0 | 18.6 | −0.4 | 5 |
| C-1 | 48 | 11 | 192 | 65.5 | 43 | 4 | 4 |

TABLE 2A-continued

Fat powders prepared using set-up A

| Example | A | B | C | D | E | F | G |
|---|---|---|---|---|---|---|---|
| C-2 | 22 | 1 | 292 | 60.4 | 24 | 14 | NM |
| C-3 | 32 | 14 | 248 | 63.4 | 31 | 4 | −3 |
| C-4 | 17 | 1 | 207 | 61.2 | 17 | 10 | 15 |
| C-13 | 26.7 | 4.5 | 275 | 63.0 | 18.4 | 7.5 | 11 |

A - Fat throughput (kg/h)
B - CO2 throughput (kg/h)
C - Pressure at nozzle (bar)
D - Temperature at nozzle (degrees Celsius)
E - Flow cooling gas (kg/h)
F - Temperature exhausting gas (degrees Celsius)
G - Temperature powder at end (degrees Celsius)
NM—not measured

TABLE 2B

Used nozzle parts (SK series SprayDry, ex Spraying Systems)

| Examples | A | B | C |
|---|---|---|---|
| 1, 3, 13, C-2, C-4, C-13 | 0.340 | 80 | 16 |
| 2, 4, C-1, C-3 | 0.400 | 78 | 17 |

A-Orifice insert diameter (mm)
B-Orifice insert size No.
C-Core size No.

TABLE 3

FWHM and free flowing density for fat powders prepared using set-up A

| Ex. | FWHM # (not corrected) (degrees) | FWMH ## (corrected) (degrees) | Free flowing density (g/l) |
|---|---|---|---|
| 1 | 0.483 | 0.303 | 48 |
| 2 | 0.473 | 0.293 | 70 |
| 3 | 0.446 | 0.266 | 87 |
| 4 | 0.442 | 0.262 | 77 |
| 13 | 0.424 | 0.244 | 48 |
| C-1 | 0.416 | 0.236 | 133 |
| C-2 | 0.423 | 0.243 | 152 |
| C-3 | 0.420 | 0.240 | 105 |
| C-4 | 0.416 | 0.236 | 208 |
| C-13 | 0.357 | 0.177 | 123 |

The FWHM as measured with the Bruker D8 Discover X-ray diffractometer with GADDS in a theta/theta configuration.
The FWHM corrected for the instrumental broadening of the Bruker D8 Discover X-ray diffractometer with GADDS in a theta/theta configuration as used. Correction factor is 0.180 degrees.

Set Up for Batch Wise Production of Fat Powder (Set-Up B)

Figure 2:
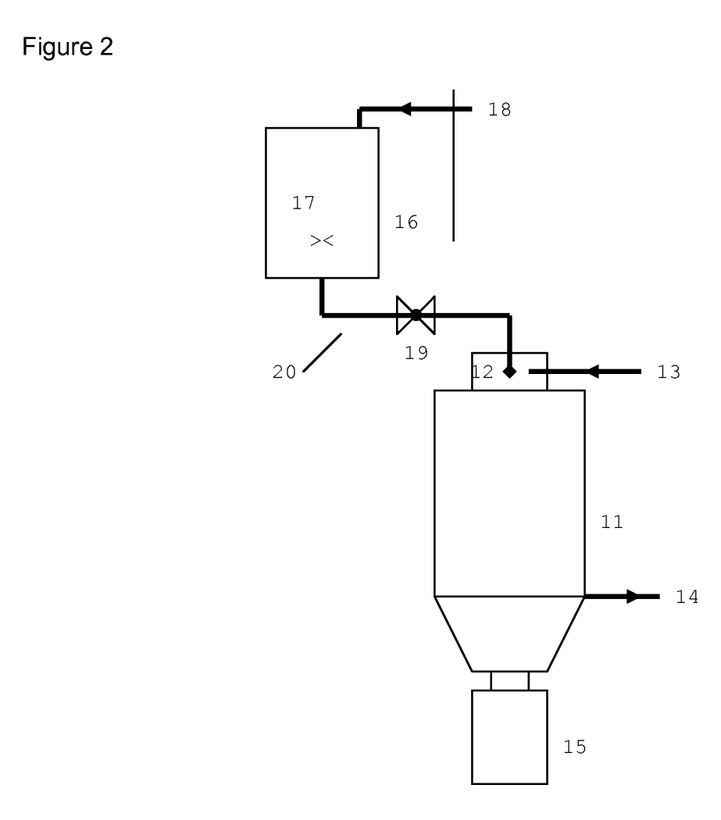
FIG. 2 is a schematic representation of the set up for the batch wise production of edible fat powder as used for the preparation of examples 5 and 6 and comparative example C-5 and C-6.

FIG. 2 is a schematic representation of the set up for the batch wise production of edible fat powder as used for the preparation of examples 5 and 6 and comparative example C-5 and C-6.

Set-up B consists of an autoclave (16) with a content of 600 ml (Premex Reactor AG HPM-PT-060, Wno. 14571, Art no. PT.060.462.45, ex Premex, CH) equipped with a mechanical stirrer (17) (six blade propeller stirrer, length 10.6 cm, 1 cm×1 cm blades of 1.5 mm thick). The autoclave has connections at the top and at the bottom. The top connection (18) was used to pressurize the system with CO2. The mixture from the vessel is expelled from the bottom of the autoclave via tube (20) through valve (19) over nozzle (12) (orifice 0.34 mm SIA80/core SKA16/cap CPP37729-SS, ex Spraying Systems, Ridderkerk, NL) to about atmospheric pressure in an expansion vessel (11) (main section: height 26.1 cm and diameter 60 cm, conical bottom part: height 37 cm and diameter from 60 cm to 15 cm). The dimensions of the tube between the bottom of the autoclave and the nozzle are (3 cm vertical, 20 cm horizontal, 3 cm vertical, 4 mm inner diameter, 6 mm outer diameter).

The autoclave is heated with an oil bath with heat transfer fluid. Tube (20) and nozzle (12) are kept at the desired temperature by heating tape (1.5 meters/5 mm wide Isopad SiS-10 CE/SN:02401022774/PN:328552-000, from Isopad BV/Tyco Thermal, Wijk bij Duurstede, NL) using a Thyristor to adjust the temperature of the heating tape.

The expansion vessel is cooled with additional CO2 over inlet (13). A small barrel (15) (15 liters, model 729348-90, from Vink, Lisse, NL) for collection of the sprayed powder is mounted at the bottom of the expansion vessel. The gas in the expansion vessel leaves the vessel via a tube shaped membrane filter (14) (polypropylene, length 25.5 cm, outer diameter 6 cm, inner diameter 2.5 cm) thereby keeping the pressure inside the expansion vessel at atmospheric pressure.

Preparation of Fat Powders Using Set-Up B

The system (i.e. autoclave) is adjusted to the desired temperature and pressure. The temperature of tube (20) and nozzle (12) was set at a temperature above the melting temperature of the fat mixture using the Thyristor. The fat mixture (297 gram) was melted and the melted fat mixture was then poured into the autoclave. The autoclave was closed and the mixture was stirred with the mechanical stirrer at the desired speed. Liquid CO2 was added over connection (18) in steps of 30 bar till the desired working pressure is reached and the system was left till a steady state condition was reached (i.e. constant pressure and temperature, see Table 4). The expansion vessel was cooled to the desired temperature with CO2 gas over inlet (13). The CO2-melt mixture was expanded (i.e. sprayed) over nozzle (12) to atmospheric pressure in expansion vessel (11) and external CO2 gas (13) at the top of the expansion vessel was used for additional cooling to keep the expansion vessel at the desired temperature. Upon expansion of the CO2-melt mixture into the expansion vessel the evaporation of dissolved CO2 and the entrainment of CO2 into the spray caused crash-cooling conditions, which lead to very rapid solidification. The resulting powder was collected in barrel (15) below the expansion vessel and stored at a temperature of minus 20 degrees Celsius. The gas left the expansion vessel via membrane filter (14). The temperature and the pressure as measured in the autoclave dropped upon expansion (as mentioned in Table 4).

The FWHM and free flowing density were determined according to the method as described above.

TABLE 4

Fat powders prepared using set-up B

| Ex. | Fat Mix | A | B | C | D | E |
|---|---|---|---|---|---|---|
| 5 | inES44 | 350 rpm 64-61 C. 182-178 bar | 368 g | 3'8" −22.6 C. | 91% | 1014 g |
| 6 | PO58 | 350 rpm 64-54 C. 185-171 bar | 373 g | 2'44" −22.2 C. | 88% | 921 g |
| C-5 | inES44 | 75 rpm 62-51 C. 102-103 bar | 190 g | 1'8" −4--8 C. | 87% | 444 g |

TABLE 4-continued

Fat powders prepared using set-up B

| Ex. | Fat Mix | A | B | C | D | E |
|---|---|---|---|---|---|---|
| C-6 | PO58 | 75 rpm<br>62-52 C.<br>102-103 bar | 185 g | 59"<br>0--4 C. | 99% | 362 g | inES44 is an interesterified blend of 60 wt % palm kernel oil hardened to a slip melting point of 39 degrees Celsius and 40 wt % palm oil hardened to a slip melting point of 58 degrees Celsius.
PO58 is palm oil hardened to a slip melting point of 58 degrees Celsius.
A - Autoclave: mixing speed (rpm), temperature (degrees Celsius), pressure (bar)
B - Mass flow $CO_2$ to autoclave (gram)
C - Spray time (min-sec), temperature of expansion vessel (degrees Celsius)
D - Powder yield (obtained powder/used fat, wt %)
E - Total mass flow $CO_2$ for autoclave plus cooling (gram)

TABLE 5

FWHM and free flowing density for fat powders prepared using set-up B.

| Ex. | FWHM #<br>(not corrected)<br>(degrees) | FWHM ##<br>(corrected)<br>(degrees) | Free flowing<br>density<br>(g/l) |
|---|---|---|---|
| 5 | 0.551 | 0.371 | 59 |
| 6 | 0.455 | 0.275 | 64 |
| C-5 | 0.475 | 0.295 | 157 |
| C-6 | 0.362 | 0.182 | 199 |

\# The FWHM as measured with the Bruker D8 Discover X-ray diffractometer with GADDS in a theta/theta configuration.
\#\# The FWHM corrected for the instrumental broadening of the Bruker D8 Discover X-ray diffractometer with GADDS in a theta/theta configuration as used. Correction factor is 0.180 degrees.

Preparation of Spreads

Spreads with a composition as in Table 6 were made according to the method as described below using the edible fat powders of examples 1 to 6 and 13 and comparative example C-1 to C-5 and C-13.

TABLE 6

Spreads compositions

|  | Composition A (parts) | Composition B (parts) | Composition C (parts) |
|---|---|---|---|
| AQUEOUS PHASE |  |  |  |
| Tap water | 65.44 | 66.50 | 65.50 |
| Starch A | 4.00 | — | — |
| Starch B | — | 4.00 | 4.00 |
| Gelatin | 1.00 | — | 1.00 |
| Buttermilk powder | 0.55 | 0.55 | 0.55 |
| NaCl | 0.75 | 0.75 | 0.75 |
| Potassium sorbate | 0.18 | 0.18 | 0.18 |
| Sunflower oil | — | 4.70 | 4.70 |
| Dimodan HP | — | 0.30 | 0.30 |
| TOTAL | 71.99 | 76.98 | 76.98 |
| pH (20 wt % aqueous citric acid) | 4.8 | 4.8 | 4.8 |
| FAT PHASE |  |  |  |
| Sunflower oil | 23.52 | 20.14 | 20.13 |
| Fat powder | 4.48 | 2.80 | 2.80 |

TABLE 6-continued

Spreads compositions

|  | Composition A (parts) | Composition B (parts) | Composition C (parts) |
|---|---|---|---|
| Colorant | 0.15 | 0.06 | 0.075 |
| Flavor | 0.01 | — | — |
| TOTAL | 28.01 | 23.00 | 23.00 |

Starch A: Purity SUV, modified tapioca starch (distarch phosphate) ex National Starch Company, USA (cook-up starch, cooked for 15 minutes at 85 degrees Celsius)
Starch B: Merigel 341, modified pre-gelled waxy corn starch (hydroxypropyl distarch) ex Tate & Lyle Europe (pre-gelled starch, needs to be dispersed at 40 to 50 degrees Celsius at low shear)
Gelatin: pig skin gelatine, bloom 240-265, 20 mesh, ex Gelita, DE
Dimodan HP: molecularly distilled mono/diacylglyceride mixture derived from fully hardened palm oil (90% monoglyceride) ex Danisco, DK

TABLE 7

Spreads and fat powders used

| Example<br>(spread) | Fat power<br>used | Composition<br>used |
|---|---|---|
| 7 | 1 | Composition A |
| 8 | 2 | Composition A |
| 9 | 3 | Composition A |
| 10 | 4 | Composition A |
| C-7 | C-1 | Composition A |
| C-8 | C-2 | Composition A |
| C-9 | C-3 | Composition A |
| C-10 | C-4 | Composition A |
| 14 | 13 | Composition B |
| C-14 | C-13 | Composition B |
| 11 | 5 | Composition B |
| 12 | 6 | Composition C |
| C-11 | C-5 | Composition B |

Slurry Preparation

First 1.8 kg of a slurry was made by dispersing the fat powder in cold sunflower oil of about 5 degrees Celsius, while degassing under vacuum.

The oil was weighed and pre-cooled to 5 degrees Celsius in an Esco-Labor (ESCO-Vacuum mixer processing plant Type EL3 with 4.5 liter vessel in pharmaceutical version, ex ESCO-Labor AG, CH). The powder was weighed using a pre-cooled (5 degrees Celsius) vessel and scoop, and added to the oil in several steps via a funnel on top of the Esco-Labor. The powder was sucked stepwise into the oil using vacuum. After each step a valve under the funnel was closed and the pressure dropped significantly. The density of the final slurry was measured to check if the de-aeration process was completed. Sometimes lumps were formed. After pouring the slurry into a pre-cooled can of 5 degrees Celsius, it was made homogeneous and smooth by applying an Ultra-turrax (T 50 basic ULTRA-TURRAX®, ex IKA® Werke GmbH & Co. KG, DE) for a few minutes at the lowest level of shear.

Examples 7 to 10 and 14 and Comparative Examples C-7 to C-10 and C-14

Slurry Phase

Colorant and flavor were added to the slurry as prepared above and the slurry was brought into the fat feed tank of the spreads production line.

The fat feed tank is a double walled stainless steel vessel with an internal diameter of 125 mm and a height of 310 mm, equipped with a ribbon stirrer, pushing the product downwards to the outlet opening in the bottom of the tank. The tank is thermo-stated at 5 degrees Celsius.

Aqueous Phase

The aqueous phase was prepared by mixing two phases (I) and (II). Phase I being a mixture of about 80% of the water and the starch was prepared in the standard way and cooled to 50 degrees Celsius. Phase II being a mixture of the remainder of the water, salt, potassium sorbate, gelatin and butter milk powder, was prepared at 50 degrees Celsius and subsequently pasteurized at 75 degrees for 10 minutes. The two phases were mixed and the pH adjusted to the desired pH with a 20% citric acid solution.

Then the mixture was poured into the aqueous feed tank of the spreads production line. The aqueous feed tank is a double walled stainless steel vessel with an internal diameter of 175 mm and a height of 250 mm, equipped with an agitator (gate-stirrer type), thermo-stated at 5 degrees Celsius.

Spreads Production

The fat feed tank and the aqueous feed tank feed via a junction point into a 50 ml double walled stainless steel pin stirrer, with two rows of 4 stator and rotor pins.

Initially the slurry phase was pumped into this system including the pin stirrer to fill it completely. Then both phases were pumped into the system at the required ratio using 2 gear pumps. After the junction point the mixture is pumped at about 12 kg/h, using a third gear pump, into the pin stirrer, which results in a residence time of 15 seconds in the stirrer. The pin stirrer is thermo-stated at 8° C. and operated at 2800 rpm.

The final product was filled into 150 ml plastic tubs and stored at 5 degrees Celsius.

Examples 11 and 12 and Comparative Example C-11

The method as described above was used, except for the following.

The gelatine was added to aqueous phase I instead of aqueous phase II. After preparing the aqueous phase II, a solution of Dimodan HP in sunflower oil was added, and the mixture was stirred using an Ultraturrax stirrer for 15 min at 7600 rpm. Then aqueous phase I was added and mixed at low shear. Finally, the pH was adjusted. The aqueous phase was not pasteurized.

The fat feed tank was thermo-stated at 8 degrees Celsius for example 11 and comparative example C-11; and at 12.5 degrees Celsius for example 12. The pin stirrer operated at 2000 rpm.

The aqueous feed tank was thermo-stated at 60 degrees Celsius. During the spreads production the aqueous phase was pumped first through a tubular heat exchanger, cooled at 1.5 degrees Celsius, to get a temperature drop from 60 to about 6-8 degrees Celsius, just before the junction point.

Details of the processing are given in Tables 8 and 9.

TABLE 8

Spreads processing conditions for examples 7 to 10 and 14 and comparative examples C-7 to C-10 and C-14.

| Ex. | Flow fat phase (kg/hr) | Flow aqueous phase (kg/hr) | Temp. fat phase # (° C.) | Temp. aqueous phase # (° C.) | Temp. pin stirrer in (° C.) | Temp. pin stirrer out (° C.) | Moisture content (wt %) |
|---|---|---|---|---|---|---|---|
| 7 | 3.51 | 8.75 | 10.0 | 10.0 | 16.0 | 16.8 | 64.2 |
| 8 | 3.17 | 7.24 | 9.4 | 6.6 | 17.1 | 17.9 | 63.2 |
| 9 | 3.23 | 7.24 | 8.1 | 6.6 | 16.2 | 18.3 | 65.8 |
| 10 | 3.64 | 8.65 | 10.7 | 9.6 | 17.0 | 19.9 | 64.2 |
| 14 | 3.47 | 8.79 | 10.5 | 9.1 | 16.9 | 20.3 | 64.8 |
| C-7 | 3.64 | 8.65 | 9.0 | 12.6 | 17.7 | 18.8 | 64.8 |
| C-8 | 3.17 | 7.24 | 7.4 | 6.9 | 14.9 | 16.4 | 63.6 |
| C-9 | 3.57 | 8.85 | 7.5 | 9.7 | 17.6 | 17.8 | 66.0 |
| C-10 | 3.16 | 7.24 | 6.7 | 7.4 | 14.6 | 15.9 | 65.0 |
| C-14 | 3.38 | 8.82 | 11.3 | 9.9 | 17.8 | 20.8 | 66.8 |

As measured directly before the gear pump.

TABLE 9

Spreads processing conditions for examples 11 and 12 and comparative example C-11.

| Example | 11 | 12 | C-11 |
|---|---|---|---|
| AQUEOUS PHASE | | | |
| Flow (kg/hr) | 9.18 | 9.32 | 9.24 |
| Temp. before cooling (° C.) | 64 | 64 | 62.6 |
| Temp. after cooling (° C.) | 8.8 | 8.9 | 5.1 |
| FAT PHASE | | | |
| Flow (kg/hr) | 2.86 | 2.8 | 2.82 |
| Temp. before pump (° C.) | 13.3 | 15.8 | 11.4 |
| PIN STIRRER | | | |
| Temperature in (° C.) | 12.1 | 13.1 | 13.5 |
| Temperature out (° C.) | 14.1 | 16.1 | 15.1 |
| Line pressure (bar) | 4.5 | 3.5 | 2 |
| Moisture content (wt %) | 67.2 | 67.4 | 65.0 |

Results

The hardness, spreadability, free water and the droplet size (D3,3) after stabilization at 5 degrees Celsius as well as after a heat stability test at 30 degrees Celsius and re-stabilization at 5 degrees Celsius was determined for each of the spreads according to the methods as described above.

TABLE 10

Spreads analyses

| Ex. | Hardness | Spreadability | Free water | D3,3 5 degrees Celsius @ | D3,3 30/5 degrees Celsius @@ |
|---|---|---|---|---|---|
| 7 | 65 | 1 | 2.5 | 8.6 | 16.9 |
| 8 | 86 | 1.5 | 2 | 10.2 | 45 |
| 9 | 65 | 1.5 | 2.5 | 11.6 | 20.6 |
| 10 | 63 | 1.5 | 0.5 | 12.2 | 24.7 |
| 14 | 64 | 2 | 0.5 | 19.9 | 51.0 |
| C-7 | 29 | 2.5 | 3.5 | 88 | 100 |
| C-8 | 37 | 2 | 0.5 | 17 | 69.4 |
| C-9 | 29 | 3 | 2.5 | 44 | 100 |
| C-10 | 29 | 2.5 | 4.5 | 62.1 | 100 |
| 11 | 51 | 2 | 0 | 12.5 | 55 |
| 12 | 34 | 2.5 | 1.5 | 21.2 | 25.5 |
| C-11 | Failure O/W at fill | — | — | — | — |
| C-14 | 41 | 2.5 | 2.5 | 100.0 | 100.0 |

@ D3,3 determined after stabilization at 5 degrees Celsius.
@@ D3,3 determined after a heat stability test at 30 degrees Celsius and re-stabilization at 5 degrees Celsius.

The invention claimed is:

1. Edible fat powder having a full width at half maximum of the first order long spacing X-ray diffraction peak of 0.17 to 0.80 degrees and a free flowing density of 10 to 350 g/l; with the proviso that when the free flowing density is equal to or greater than C, the full width at half maximum is equal to or greater than ((A*free flowing density)+B), wherein A is 0.0005625, B is 0.213 degrees and C is 90 g/l.

2. Edible fat powder according to claim 1 wherein the full width at half maximum is from 0.17 to 0.70 degrees.

3. Edible fat powder according to claim 1 wherein the free flowing density is from 20 to 300 g/l.

4. Edible fat powder according to claim 1 wherein A is 0.0005800.

5. Edible fat powder according to claim 1 wherein B is 0.220 degrees.

6. Edible fat powder according to claim 1 wherein C is 80 g/l.

7. Edible fat powder according to claim 1 comprising at least 80 wt % of structuring fat.

8. Edible fat powder according to claim 1 wherein said fat powder essentially consists of structuring fat.

9. Edible fat powder according to claim 1 wherein the structuring fat present in said fat powder has a solid fat content N10 from 50 to 100, N20 from 26 to 95 and N35 from 5 to 60.

10. Method of preparing a fat continuous spread, the method comprising of:
   a: mixing fat powder and oil wherein the fat powder comprises structuring fat to provide a slurry;
   b: providing an aqueous phase;
   c: mixing the slurry and aqueous phase to form an oil continuous emulsion; wherein the fat powder is edible fat powder according to claim 1.

11. Method of preparing a fat continuous spread according to claim 10 wherein the spread comprises from 5 to 40 wt % fat.

12. The edible fat powder according to claim 1 wherein the full width at half maximum is from 0.19 to 0.65.

13. The edible fat powder according to claim 12 wherein the full width at half maximum is from 0.21 to 0.60.

14. The edible fat powder according to claim 13 wherein the full width at half maximum is from 0.23 to 0.55.

15. The edible fat powder according to claim 14 wherein the full width at half maximum is from 0.25 to 0.55.

16. The edible fat powder according to claim 3 wherein the free flowing density is from 25 to 250 g/l.

17. The edible fat powder according to claim 16 wherein the free flowing density is from 30 to 200 g/l.

18. The edible fat powder according to claim 17 wherein the free flowing density is from 35-180 g/l.

19. The edible fat powder according to claim 18 wherein the free flowing density is from 40 to 150 g/l.

20. The edible fat powder according to claim 1 wherein A is 0.0006000.

* * * * *